Figure 1:
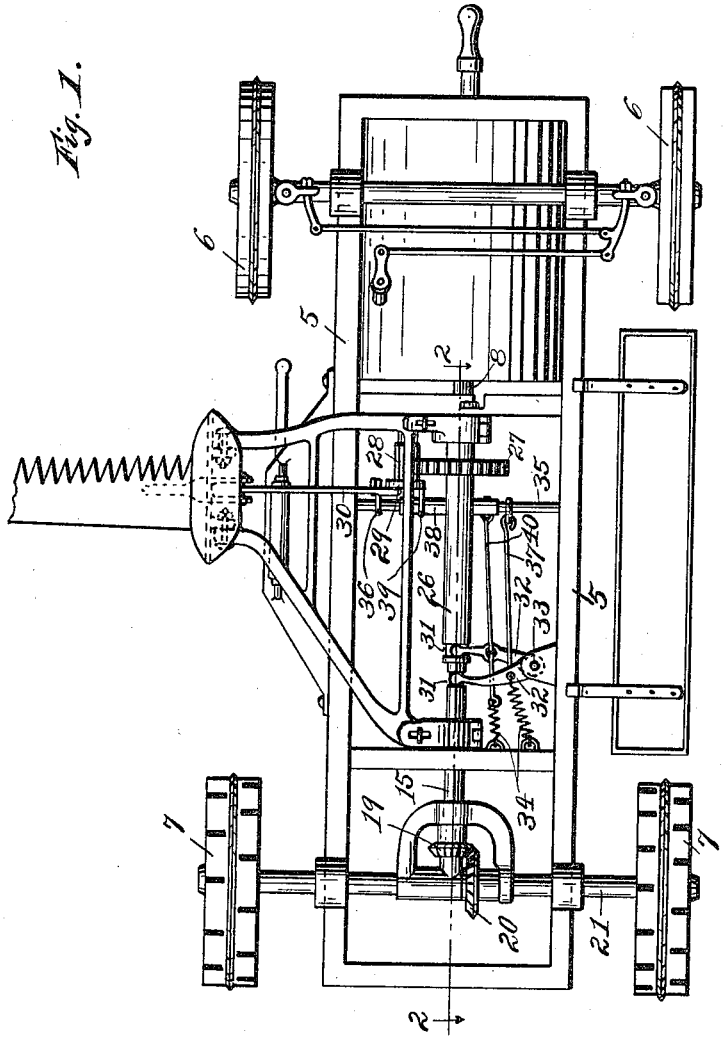

C. F. RADATZ.
CLUTCH FOR TRACTION MOWERS.
APPLICATION FILED JAN. 5, 1914.

1,148,623.

Patented Aug. 3, 1915.
2 SHEETS—SHEET 1.

Witnesses:
T. Colson,
C. E. Wessels.

Inventor:
Charles F. Radatz,
Joshua R. H. Potts
his Attorney.

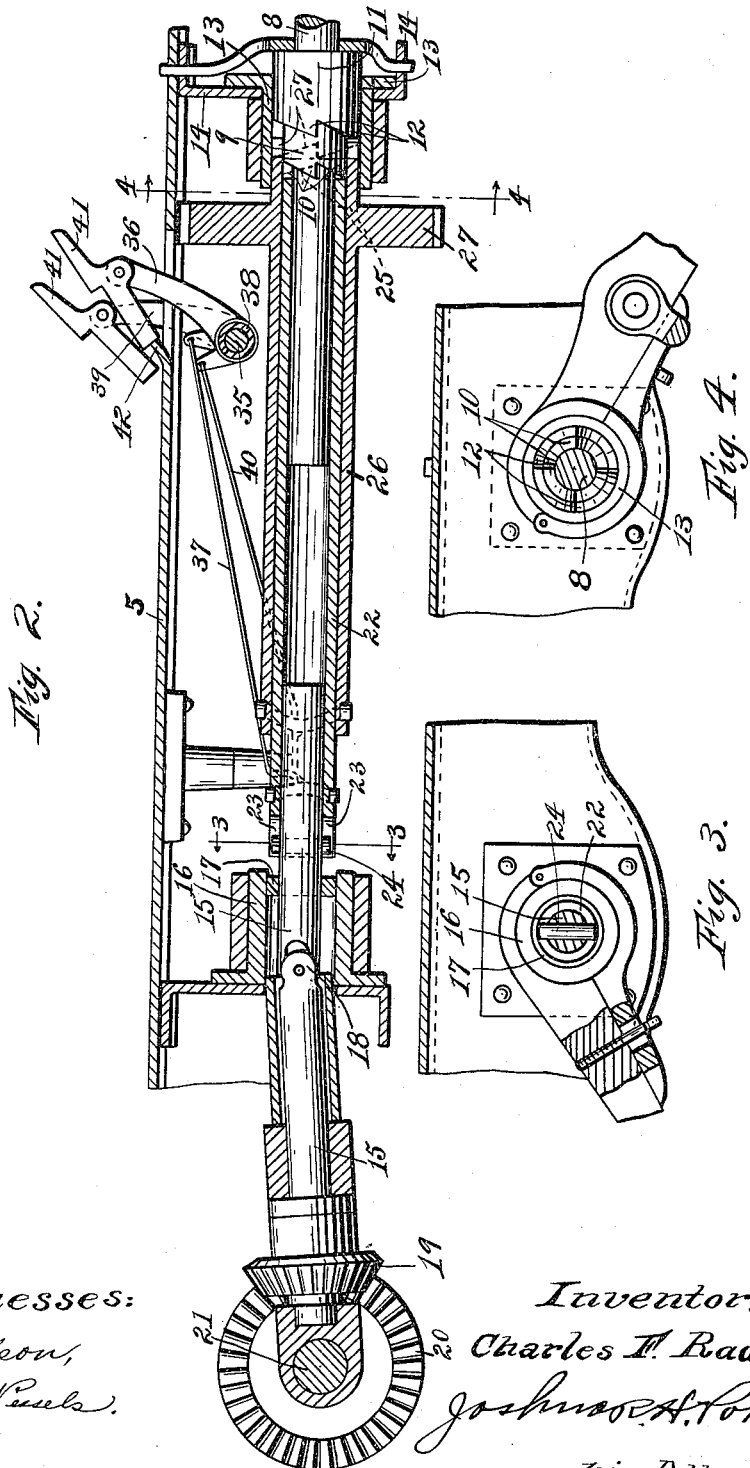

UNITED STATES PATENT OFFICE.

CHARLES F. RADATZ, OF KENOSHA, WISCONSIN.

CLUTCH FOR TRACTION-MOWERS.

1,148,623.  Specification of Letters Patent.  Patented Aug. 3, 1915.

Original application filed August 6, 1913, Serial No. 783,272. Divided and this application filed January 5, 1914. Serial No. 810,376.

*To all whom it may concern:*

Be it known that I, CHARLES F. RADATZ, a citizen of the United States, and a resident of the city of Kenosha, county of Kenosha, and State of Wisconsin, have invented certain new and useful Improvements in Clutches for Traction-Mowers, of which the following is a specification.

My invention relates to new and useful improvements in clutch devices for traction mowers and constitutes a divisional application of the application filed by me on August 6th, 1913, Serial No. 783,272.

The object of this improvement is to provide a simple and effective means whereby the traction portion of the device may be thrown into and out of operative condition independently of the means for operating the mower attachment, and one in which the motive power is employed for operating both the traction and mower portions of the device.

The invention consists in the combinations and arrangements of parts hereinafter described and claimed.

The invention will be best understood by reference to the accompanying drawings forming a part of this specification, and in which, Figure 1 is a bottom plan view of a traction mower embodying my invention, Fig. 2, an enlarged section of the same taken on line 2—2 in Fig. 1, and Figs. 3 and 4 are sections taken on lines 3—3 and 4—4 respectively in Fig. 2.

The preferred form of construction as illustrated in the accompanying drawings comprises a frame 5 having front ground wheels 6 and rear traction wheels 7.

In the forward part of the device is a motor driven driving shaft 8 having an enlargement 9 carrying clutch teeth 10 and a second enlargement 11 carrying clutch teeth 12. The enlargement 11 is journaled in a bearing 13 secured to a cross beam 14 of the frame 5.

In alinement with the motor driving shaft 8 is a driven shaft 15 which is journaled in a bearing member 16 having a bearing portion 17 secured therein. The shaft 15 is provided with a universal joint 18 therein and carries at its rear end a bevel pinion 19 meshing with a bevel gear 20. The bevel gear 20 is secured on the rear axle 21 and adapted to convey power to the traction wheels 7 in order to make the device self-propelling.

On the adjacent ends of shafts 15 and 8 is mounted a hollow, or tubular shaft 22. The shaft 22 is provided with slots 23 which engage a pin 24, the latter passing through shaft 15 and provides a means whereby shafts 15 and 22 will be caused to rotate simultaneously and permit of longitudinal relative movement thereof.

At the forward end of shaft 22 are provided clutch teeth 25 adapted to engage the clutch teeth 10 to establish an operative connection between the shaft 22 and motor driven shaft 8.

Journaled on the shaft 22 is a second hollow, or tubular shaft 26 carrying at one end clutch teeth 27 adapted to engage clutch teeth 12 to establish an operative connection between the motor driving shaft 8 and the tubular shaft 26. On the shaft 26 is a gear 27 which meshes with a smaller gear 28. The gear 28 is carried by a shaft which carries the pitman wheel 29. The pitman wheel 29 is adapted to operate the pitman rod 30 of the mower attachment, as will be readily understood. The mower attachment of the device is clearly set forth in my application above referred to and forms no part of this invention.

In each of the tubular shafts 22 and 26 is formed an annular groove 31, and a lever 32, which is pivoted to the frame 5, as at 33, operatively engages each groove 31 to effect longitudinal movement of said shafts 22 and 26. Each of the levers 32 is provided with a tension spring 34, and are adapted to normally maintain the clutch teeth 25 and 27 out of engagement with the clutch teeth 10 and 12 respectively.

In the forward part of the device is a shaft 35 which carries a pedal arm 36 and is operatively connected with one of the levers 32 by means of a connecting rod 37.

On the shaft 35 is rotatably mounted a sleeve 38. Said sleeve 38 carries a pedal arm 39 similar to pedal arm 36. The pedal arm 39 is connected with the other lever 32 by means of a connecting rod 40.

At the upper end of each of the pedal arms 36 and 39 are provided toe clips 41 which are adapted to engage an upturned portion 42 of the frame 5 to maintain the clutch teeth in operative conditions.

From this construction, it will be observed, that upon forward movement of pedal arm 36, clutch teeth 25 and 10 will be moved to operative condition and upon forward movement of pedal arm 39, clutch teeth 27 and 12 will be moved to operative condition, each set of coöperating clutch teeth being moved into and out of operative condition independently.

While I have illustrated and described the preferred form of construction for carrying my invention into effect, this is capable of variation and modification without departing from the spirit of the invention. I, therefore, do not wish to be limited to the exact details of construction set forth, but desire to avail myself of such variations and modifications as come within the scope of the appended claims.

Having described my invention what I claim as new and desire to secure by Letters Patent is:

1. The combination of a frame; a driving shaft journaled in said frame and having two sets of clutch teeth thereon; a driven shaft mounted in said frame; a hollow shaft journaled on said driving shaft and mounted on said driven shaft; clutch teeth on said hollow shaft engaging one set of clutch teeth on said driving shaft; a second hollow shaft journaled on said first mentioned hollow shaft; clutch teeth on said second mentioned shaft engaging the other set of clutch teeth on said driving shaft; and means for independently actuating said hollow shafts for engaging and disengaging the clutch teeth, substantially as described.

2. The combination of a frame; a driving shaft journaled in said frame and having two sets of clutch teeth thereon; a driven shaft mounted in said frame; a hollow shaft journaled on said driving shaft and mounted on said driven shaft; a slot and pin connection between said driven shaft and hollow shaft; clutch teeth on said hollow shaft engaging one set of the clutch teeth on said driving shaft; a second hollow shaft journaled on said first mentioned hollow shaft; clutch teeth on said second mentioned hollow shaft engaging the other set of clutch teeth on said driving shaft; and means for independently actuating said hollow shafts for engaging and disengaging the clutch teeth, substantially as described.

3. The combination of a frame; a driving shaft journaled in said frame and having two sets of clutch teeth thereon; a driven shaft mounted in said frame; a hollow shaft journaled on said driving shaft and mounted on said driven shaft; a slot and pin connection between said driven shaft and hollow shaft; clutch teeth on said hollow shaft engaging one set of the clutch teeth on said driving shaft; a second hollow shaft journaled on said first mentioned hollow shaft; clutch teeth on said second mentioned hollow shaft engaging the other set of clutch teeth on said driving shaft; and independent means carried by said frame, connected with said hollow shafts and adapted to disengage each set of coöperating clutch teeth independently, substantially as described.

4. The combination of a frame; a driving shaft journaled in said frame and having two sets of clutch teeth thereon; a driven shaft in alinement with said driving shaft; a hollow shaft on the adjacent end portions of said driving and said driven shafts, there being slots in one end of said hollow shaft; a pin through said driven shaft and engaging said slots; clutch teeth on said hollow shaft engaging one set of the clutch teeth on said driving shaft; a second hollow shaft mounted on said first mentioned hollow shaft and having clutch teeth at one end thereof engaging the other set of clutch teeth on said driving shaft; and means for throwing each of the hollow shafts into and out of operative conditions, substantially as described.

5. The combination of a frame; a driving shaft journaled in said frame and having two sets of clutch teeth thereon; a driven shaft in alinement with said driving shaft; a hollow shaft on the adjacent end portions of said driving and said driven shafts, there being slots in one end of said hollow shaft and an annular groove adjacent said slots; a pin through said driven shaft and engaging said slots; clutch teeth on said hollow shaft engaging one set of the clutch teeth of said driving shaft; a second hollow shaft mounted on said first mentioned hollow shaft and having an annular groove near one end and clutch teeth at the other end thereof, said clutch teeth engaging the other set of clutch teeth on said driving shaft; two levers pivoted on said frame, each lever engaging the annular groove in one of said hollow shafts; and a foot operable lever operatively connected with each of said levers, substantially as described.

In testimony whereof I have signed my name to this specification in the presence of two subscribing witnesses.

CHARLES F. RADATZ.

Witnesses:
Joshua R. H. Potts,
Arthur A. Olson.

Copies of this patent may be obtained for five cents each, by addressing the "Commissioner of Patents. Washington, D. C."